July 2, 1963
H. S. HENDRICKSON ETAL
3,096,045
HELICOPTER CONTROL MECHANISM
Filed Oct. 9, 1961
2 Sheets-Sheet 1
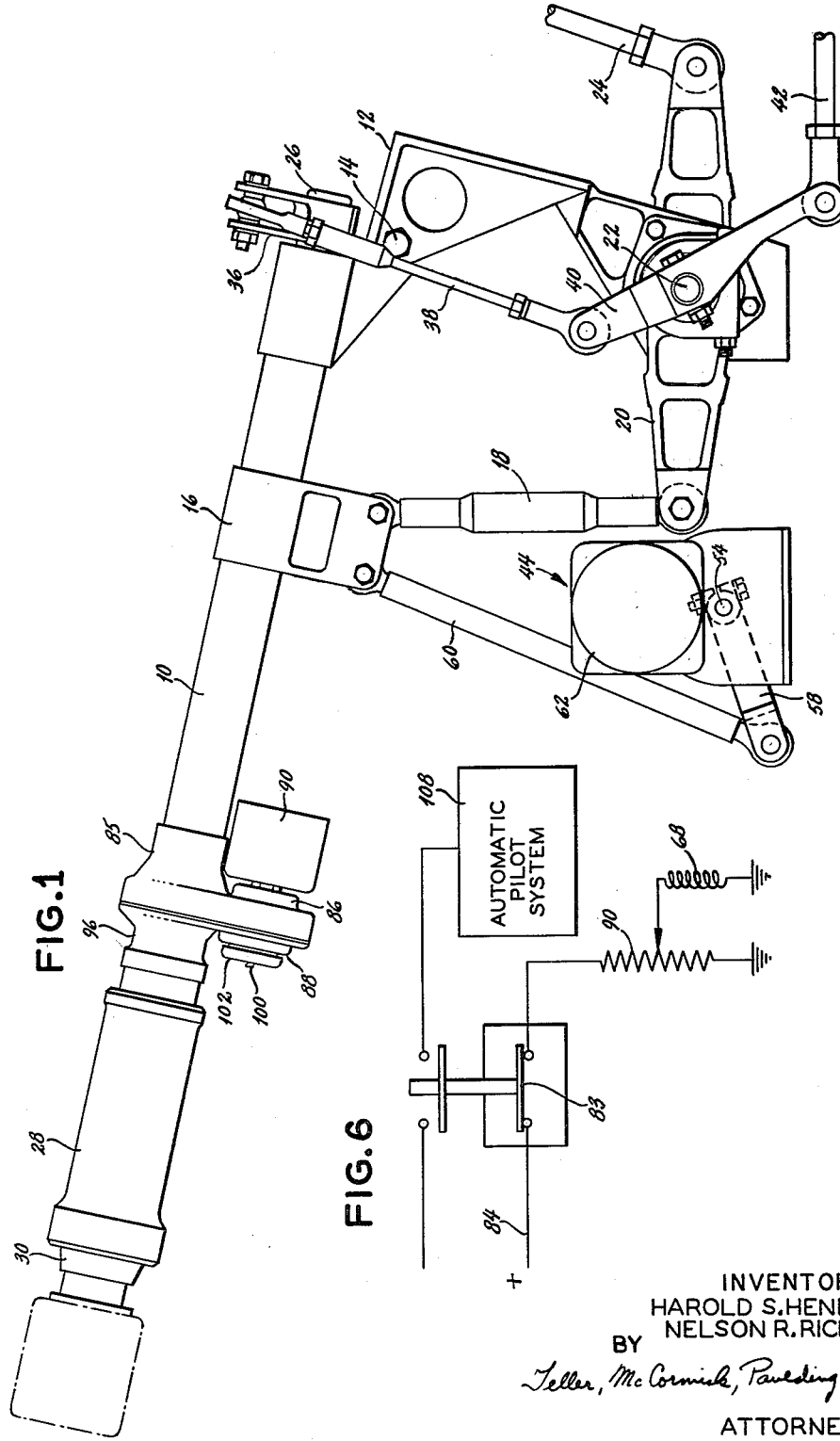
INVENTORS
HAROLD S. HENDRICKSON
NELSON R. RICHMOND
BY
Teller, McCormick, Paneding & Huber
ATTORNEYS

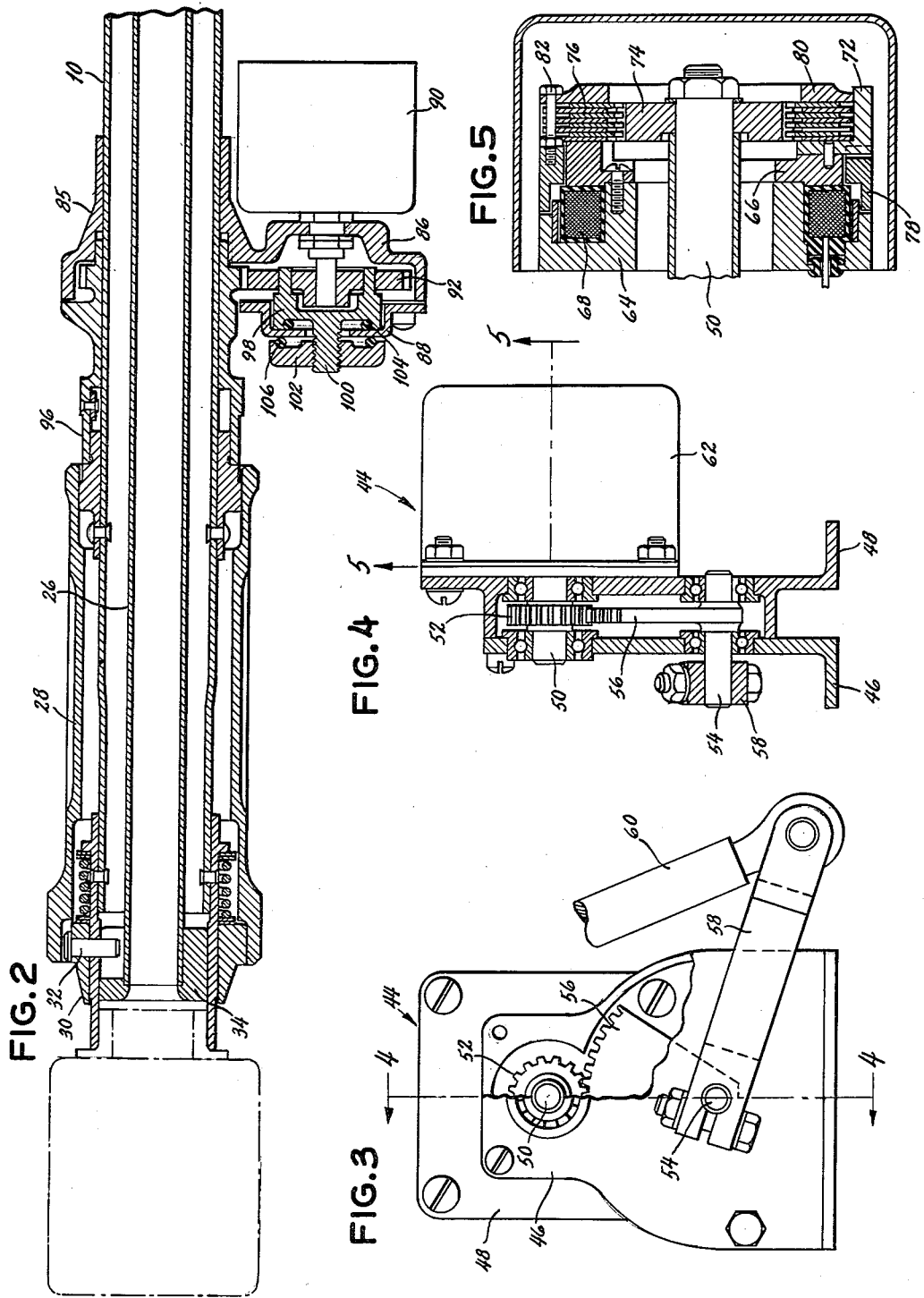

United States Patent Office 3,096,045
Patented July 2, 1963

3,096,045
HELICOPTER CONTROL MECHANISM
Harold S. Hendrickson, Bloomfield, and Nelson R. Richmond, Thompsonville, Conn., assignors to Kaman Aircraft Corporation, Bloomfield, Conn., a corporation of Connecticut
Filed Oct. 9, 1961, Ser. No. 143,651
7 Claims. (Cl. 244—17.11)

The invention relates to a helicopter control mechanism and more particularly to that portion of the mechanism that includes the pilot operable collective pitch control stick and the parts immediately associated therewith.

It is ordinarily desirable to provide a brake which is connected with the collective pitch stick for resisting movement thereof. In controlling the helicopter, the pilot can move the stick to overcome the resistance of the brake, and the brake serves to hold the stick in any position to which it has been moved. This makes it possible for the collective pitch to remain constant without any attention by the pilot.

When an automatic pilot system is provided, the braking action is objectionable, and the principal object of the invention is to provide a helicopter control mechanism wherein said brake is operative during manual control and is inoperative during automatic control.

Other objects of the invention are to provide various features of construction and connection that facilitate the advantageous attainment of the before-stated principal object.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a left side view showing the collective pitch stick of a helicopter and of various parts associated therewith.

FIG. 2 is an enlarged fragmentary vertical sectional view of the forward upper portion of the collective pitch stick and of a mechanism carried thereby.

FIG. 3 is an enlarged front view of the mechanism shown in the lower forward portion of FIG. 1 with part of one frame being shown broken away to reveal the structure of other parts.

FIG. 4 is a right side view of the mechanism shown in FIG. 3 with certain parts in section, the sectional portion of the view being taken along the line 4—4 of FIG. 3.

FIG. 5 is an enlarged fragmentary sectional view taken along said line 5—5 of FIG. 4.

FIG. 6 is a schematic diagram of electrical connections.

Referring more particularly to FIG. 1, the collective pitch stick is shown at 10, the stick being connected with a stationary bracket 12 for pivotal movement about a transverse horizontal axis at 14. Suitably secured to the stick between the ends thereof is a connector block 16 to which is pivotally connected the upper end of a link 18. The lower end of the link 18 is pivotally connected with the front end of a lever 20 which is supported between its ends for pivotal movement about a transverse horizontal axis at 22. The rear end of the lever 20 is pivotally connected with a link 24 which serves by means of various links and other parts (not shown) to adjust the blades of the helicopter rotor for collectively increasing and decreasing the pitches thereof. The connections between the stick and the rotor are such that the blade pitches are increased when the pilot moves the stick 10 upwardly and rearwardly and are decreased when the pilot moves the stick 10 downwardly and forwardly.

Referring particularly to FIG. 2, the stick 10 is tubular and a second tube 26 is centrally located within the main tube, said tube 26 being rotatively movable about its own axis. For rotatively moving the tube 26 a rotatively movable handle 28 is mounted on the stick 10 near the forward end thereof. Also mounted on the stick is a rotatively movable ring 30 which carries a radial pin 32 having an outer head entered in a notch in the handle 28. The inner portion of the pin 30 extends through an aperture in the stick which aperture is elongated to permit limited rotative movement of the handle 28 and of the ring 30. The pin 32 projects into a notch in a ring 34 secured to the tube 26.

As shown in FIG. 1, an arm 36 is secured to the rear end of the tube 26, this arm projecting at an angle upwardly and toward the left and being pivotally connected with the upper end of a link 38. The lower end of the link 38 is pivotally connected with one end of a lever 40 which is supported between its ends for pivotal movement about a transverse horizontal axis which may be coincident with the axis at 22. The opposite end of the lever 40 is pivotally connected with a link 42 which serves by means of various links and other parts (not shown) for adjusting the throttle of the engine of the helicopter. The pilot by turning the handle 28 relatively to the stick can adjust the throttle as required.

The parts thus far described are or may be conventional in form and in function and there may be wide variation as to details.

Connected with the stick 10 is a resistance mechanism 44 which is illustrated as being below the stick 10 but this location is not essential. The resistance mechanism includes a friction brake operably connected with said stick 10, an electric circuit including an electromagnet which is connected to serve upon energization or de-energization to apply or release said brake so that it is effective or ineffective for resisting movement of the stick, and a pilot operable electric switch for connecting or disconnecting an automatic pilot system to cause said system to be either operative or inoperative for actuating said helicopter control mechanism, said switch including contacts in said electromagnet circuit which serve to close said circuit so as to energize said electromagnet and apply said brake when said automatic pilot system is disconnected and inoperative and which serve to open said circuit so as to de-energize said electromagnet and release said brake when the automatic pilot system is connected and operative.

The resistance mechanism as presently preferred is shown in FIG. 1 and is shown in detail in FIGS. 3, 4 and 5. Said mechanism has two stationary frame parts 46 and 48 suitably connected with each other and held in a fixed position. Rotatably mounted in bearings in the frame parts is a transverse shaft 50 having a gear 52 connected therewith between said frame parts. Also rotatably mounted in bearings in the frame parts and below the shaft 50 is a transverse stub shaft 54 having a gear segment 56 secured thereto, which gear segment meshes with the gear 52. A lever 58 is secured to the shaft 54 at the right end thereof (the left end as viewed in FIG. 3) and said lever is connected by a link 60 with the connecting block 16 on the collective stick 10.

Secured to the frame member 48 is a housing 62 which encloses a power brake device that is connected with the shaft 50 to resist rotation thereof. The power brake device may be of any usual or preferred form and one suitable device is shown in FIG. 5. As shown, the device comprises annular magnetic members 64 and 66, an annular magnet coil 68 being located in a recess in the member 64. Engaging the magnetic member 66 is a nonmagnetic ring having an annular flange at its periphery. Located within the annular flange 72 and secured to the shaft 50 is a ring 74. Interposed between the flange 72 and the ring 74 are multiple discs 76 which constitute a friction brake. Alternate discs are connected with the flange 72 and the remaining discs are secured to the ring 74.

Surrounding the magnetic member 66 and partly surrounding the magnetic member 64 is an annular magnetic armature 78 which is transversely movable within narrow limits. A pressure plate 80 is provided for applying pressure to the friction discs 76, this plate being connected with the armature 78 by means of screws 82 located in gaps or notches in the ring 70. Only one screw 82 is shown but two or more screws are provided.

When the collective pitch stick is moved, the link 60 and the arm 58 serve to rotate the gear segment 56 which in turn rotates the gear 52 and the shaft 54. When the coil 68 is energized, it tends to move the armature 78 and the plate 80 in the direction to apply pressure to the discs 76. The discs 76 frictionally resist rotation of the ring 74 and they therefore frictionally resist movement of the collective pitch stick 10.

Referring to FIG. 6, the before-mentioned pilot operable switch is shown at 83, this switch being connected by a main lead 84 with the electrical power source on the helicopter. The switch serves when closed to energize the magnet and to apply the brake when the switch is open the magnet is de-energized and the brake is released.

A pilot operable means is preferably included in the circuit of the electromagnet 68 for varying the voltage applied thereto and for thus varying the amount of friction applied by the brake. The presently preferred means is shown in FIG. 2.

A bracket 85 is fixedly secured to the collective pitch stick 10, and the bracket has a depending portion 86 shaped to constitute a portion of a housing, a cover 88 being detachably connected with said housing portion. Fixedly secured to the housing portion 86 at the outside thereof is an adjustable voltage regulator or divider such as a potentiometer 90. The shaft of the potentiometer extends into the housing 86 and a gear 92 is secured to the shaft within the housing. The gear 92 meshes with gear teeth on a sleeve 96 which is rotatable on the stick 10. The pilot by manually rotating the sleeve 96 can adjust the potentiometer 90 to change the voltage in an electric circuit.

A variable friction device is preferably provided for resisting rotation of the gear 92 and of parts connected therewith so as to provide a feel for the adjustment of the sleeve 96. The friction device comprises a member 98 rotatable in unison with the gear 92, this member having projections that enter holes in said gear. The member 98 has a threaded central stem 100 which projects through and threadably engages a threaded central aperture in the cover 88. Secured to the stem 100 for rotation therewith is a disc or knob 102. An O-ring 104 is interposed between the member 98 and the inner face of the cover 88, and a second O-ring 106 is interposed between the disc 102 and the outer face of the cover. The O-ring 106 frictionally resists movement of the disc 102 and the O-ring 104 frictionally resists movement of the member 98 and of the parts connected therewith. In turning the sleeve 96 to adjust the potentiometer, the pilot must overcome the friction provided by the O-ring 104, and as the member 98 is rotated by the sleeve 96 the central stem 100 thereof is threaded into or out of the disc 102 to change the pressure exerted on the O-ring 104 and thereby varying the frictional resistance imposed on the movement of the sleeve 96. The direction of the threads on the stem 100 and in the disc 102 is such that as the sleeve 96 is turned in such a direction as to increase the friction or resistance applied to the stick by the power brake device, by adjustment of the potentiometer 90, the stem is threaded into the disc so that the O-ring 104 is gradually pressed more tightly against the cover 88 to gradually increase the frictional resistance applied to the sleeve 96. Similarly, as the sleeve 96 is turned to decrease the resistance applied to the stick the pressure on the O-ring 104 is reduced to reduce the frictional resistance imposed on the sleeve 96. Thus, as the pilot adjusts the sleeve 96 to change the frictional resistance imposed on the stick he will encounter a changing resistance on the sleeve 96 so as to give him a feel for the adjustment and to make it unnecessary for him to move the stick up and down to determine if the adjustment has been made in the proper direction.

The disc or knob 102 may also be turned by the pilot, while holding the sleeve 96 fixed relative to the sleeve 10, to thread the same in one direction or the other on the central stem 100 to effect an initial adjustment of the resistance imposed on the sleeve by the O-ring 104. Preferably, and as shown in FIG. 2, the O-ring 106 is larger than the O-ring 104 so that the friction force exerted on the disc 102 by the O-ring 106 is greater than the friction force exerted on the member 98 by the O-ring 104. Therefore after the disc is turned by hand to a given point of adjustment relative to the cover 88 it will hold such adjustment despite turning movement of the member 98. That is, as the member 98 is turned due to turning movement of the sleeve 96 the central stem will be threaded into or out of the disc 102 and the disc will not rotate because of the friction force exerted thereon by the O-ring 106. If desired, however, the disc 102 may be more positively fixed relative to the cover 88 after the initial adjustment has been made by means of a pin or detent device (not shown).

Referring further to the electrical diagram in FIG. 6, the main lead 84 and the switch 83 are grounded through the potentiometer 90. An adjustable lead extends from the potentiometer and is grounded through the coil 68 of the power brake device.

For normal pilot controlled flying, the switch 83 is closed, and the coil 68 is energized, this coil acting through the friction discs 76 and connected parts to resist movement of the stick 10. By means of the potentiometer the amount of voltage at the coil 68 can be adjusted according to operating conditions and to suit the preference of the pilot. The resistance is such that it will maintain the stick in any adjusted position after the stick 10 has been adjusted for a selected attitude of flight.

The switch 83 constitutes one set of contacts on a switch device having other contacts that serve to start and stop the action of an automatic pilot system shown schematically at 108. The switch 83 is closed whenever the automatic pilot mechanism is disconnected and inoperative, and the switch 83 is open whenever the automatic pilot system is connected and operative. With the switch 83 open the coil 68 is de-energized and no friction is applied, and thus the automatic pilot system is free to operate without any frictional drag. Whenever the automatic pilot system is disconnected the switch 83 is closed and the frictional resistance to stick movement is restored to the value that had been previously selected.

The invention claimed is:

1. A helicopter control mechanism including a pilot operable stick for collectively changing and controlling the pitches of the blades of the helicopter rotor, a friction brake operably connected with said stick, an electric circuit including an electromagnet which is connected to serve upon energization or de-energization to apply or release said brake so that it is effective or ineffective for resisting movement of the stick, and a pilot operable electric switch for connecting or disconnecting an automatic pilot system to cause said system to be either operative or inoperative for actuating said helicopter control mechanism, said switch including contacts in said electromagnet circuit which serve to close said circuit so as to energize said electromagnet and apply said brake when said automatic pilot system is disconnected and inoperative and which serve to open said circuit so as to de-energize said electromagnet and release said brake when the automatic pilot system is connected and operative.

2. A helicopter control mechanism as set forth in claim 1, wherein a stationary housing is provided having a rotatively movable shaft carried thereby, wherein said brake is connected with said shaft to resist rotative movement thereof, wherein said electromagnet is carried by said housing adjacent said brake, and wherein a connection is provided for rotatively moving said shaft when said stick is moved.

3. A helicopter control mechanism as set forth in claim 1, wherein a pilot operable means is included in the circuit of the electromagnet for varying the voltage applied thereto.

4. A helicopter control mechanism as set forth in claim 3, wherein said voltage varying means is carried by said collective pitch stick.

5. A helicopter control mechanism as set forth in claim 4, wherein said voltage varying means includes a bracket secured to said stick, a potentiometer carried by said bracket and having a rotatable shaft, a pilot rotatable sleeve on the stick, and intermeshing gears connected respectively with said shaft and said sleeve.

6. A helicopter control mechanism as set forth in claim 5, wherein a friction device is carried by said bracket and connected with said shaft for resisting rotation of the latter.

7. A helicopter control mechanism as set forth in claim 6, wherein a cover is connected with said bracket and cooperates therewith to constitute a housing which encloses the gear that is connected with the shaft, and wherein said friction device includes at least one element rotatable with the last said gear and frictionally engages said cover.

References Cited in the file of this patent
UNITED STATES PATENTS 1,843,966  Adams _____ Feb. 9, 1932

FOREIGN PATENTS 487,202  Canada _____ Oct. 14, 1952